United States Patent [19]
Huebscher

[11] 3,751,305
[45] Aug. 7, 1973

[54] ADJUSTABLE SPRING-LOADED TEMPERATURE SENSING DEVICE

[75] Inventor: David A. Huebscher, Maple Heights, Ohio

[73] Assignee: Alco Standard Corporation, Valley Forge, Pa.

[22] Filed: Mar. 10, 1971

[21] Appl. No.: 122,961

[52] U.S. Cl. ................... 136/221, 73/359, 136/242, 338/30
[51] Int. Cl. ............................................. H01v 1/02
[58] Field of Search ................... 136/221, 230, 232, 136/235, 242; 338/30; 73/359; 85/32 CS

[56] References Cited
UNITED STATES PATENTS

| 636,330 | 11/1899 | Glover | 85/32 CS |
| 1,264,677 | 4/1918 | Murrell | 85/32 CS |
| 3,679,490 | 7/1972 | Finkbiner | 136/221 |
| 3,468,723 | 9/1969 | Lambert | 136/221 |
| 2,493,311 | 1/1950 | Odell | 338/28 |
| 2,706,411 | 4/1955 | Bircher | 73/359 |
| 2,779,810 | 1/1957 | Horbinski | 136/221 |
| 3,516,872 | 6/1970 | Klassen | 136/221 |
| 2,476,099 | 7/1949 | Knudsen | 136/232 |
| 3,516,873 | 6/1970 | Bonkowski et al. | 136/221 |

Primary Examiner—Carl D. Quarforth
Assistant Examiner—E. E. Lehmann
Attorney—Meyer, Tilberry & Body

[57] ABSTRACT

An adjustable spring-loaded temperature sensing device includes a flexible armored cable which is utilized as a spring for biasing a tip portion of a temperature sensing unit into operative position.

6 Claims, 13 Drawing Figures

INVENTOR.
DAVID A. HUEBSCHER
BY
Meyer, Tilberry & Body
ATTORNEYS

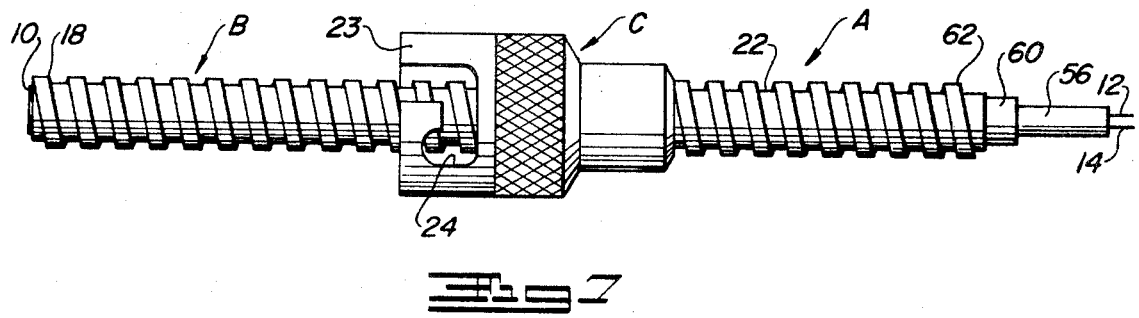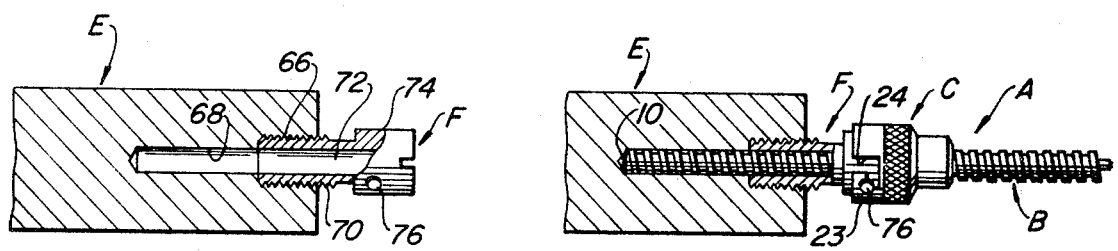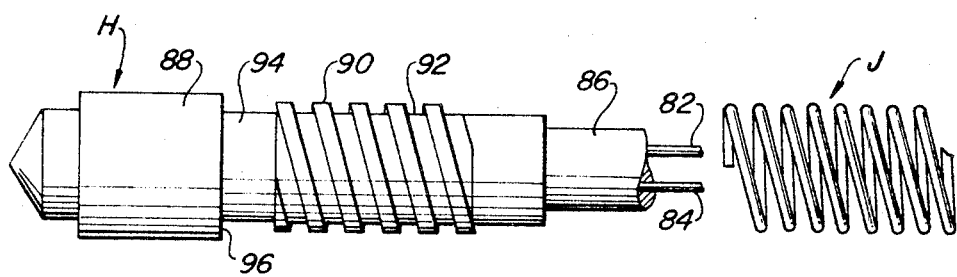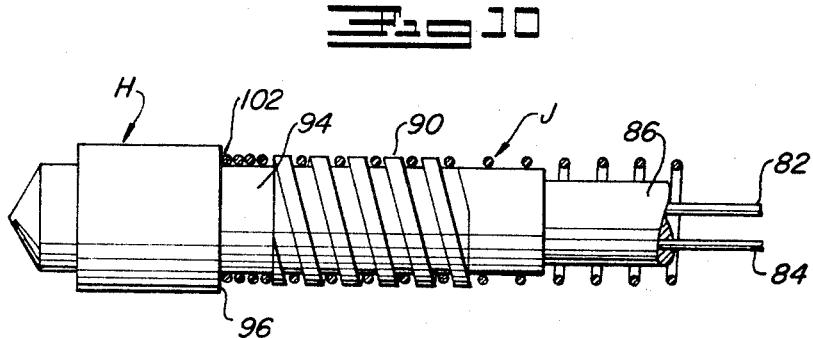

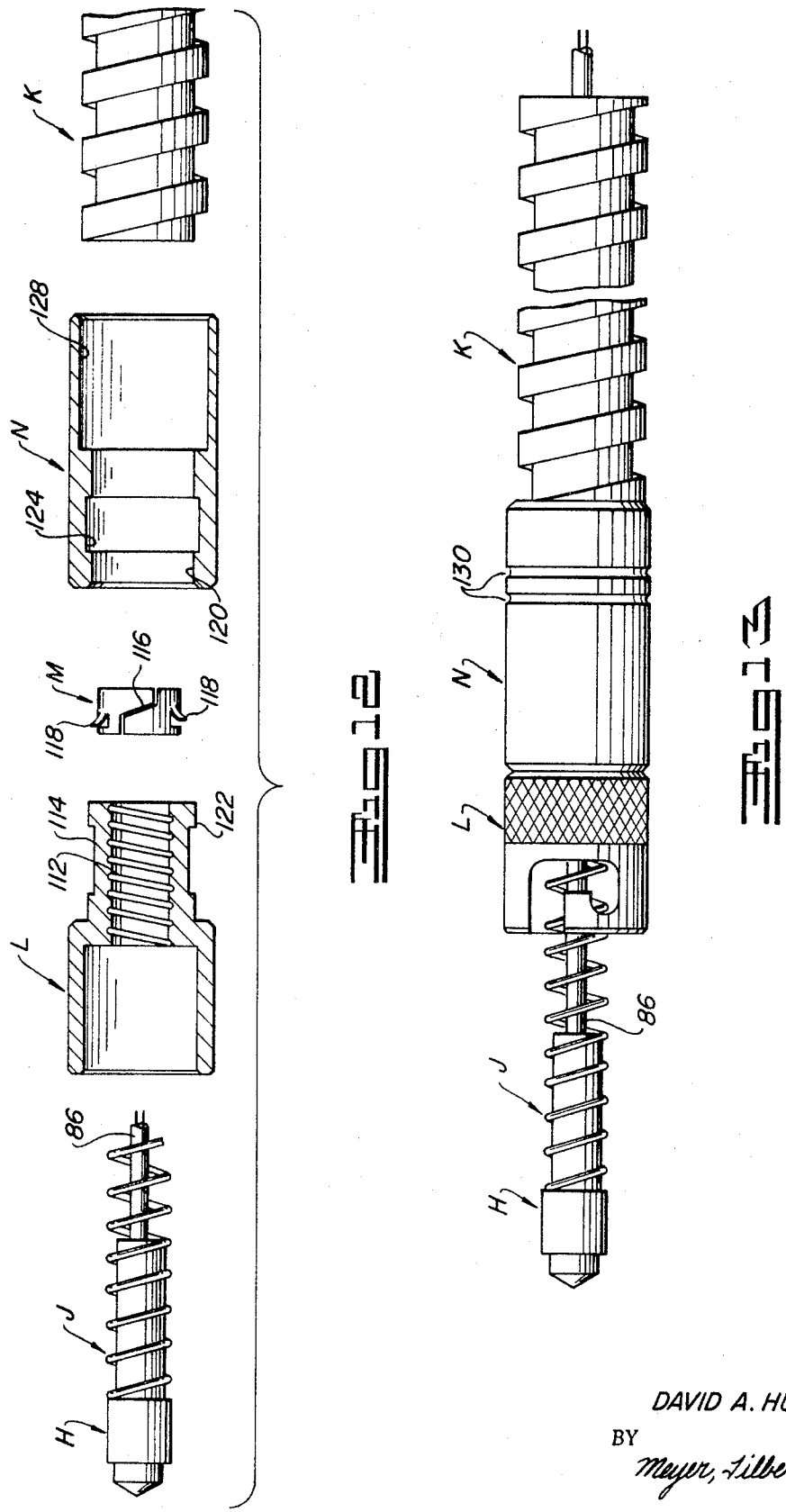

ADJUSTABLE SPRING-LOADED TEMPERATURE SENSING DEVICE

BACKGROUND OF THE INVENTION

This application pertains to the art of temperature sensing and more particularly to adjustable spring-loaded temperature sensing devices. The invention is particularly applicable to thermocouples and will be described with particular reference thereto although it will be appreciated that the invention has broader applications and may be used with other temperature sensing units.

Adjustable spring-loaded thermocouples of a known type are described in U.S. Pat. No. 3,468,723 to Lambert. Such a thermocouple assembly includes a thermocouple unit having a hot junction tip portion. A pair of wires of dissimilar material are connected within the hot junction tip portion and extend rearwardly therefrom for connection to an indicating device. An elongated tubular sheath is connected with the hot junction tip portion and surrounds a portion of the wires. A spirally coiled spring surrounds the elongated tubular sheath and has one end portion thereof connected to the rear end of the hot junction tip portion. A bayonet cap is supported by the elongated tubular sheath and has an internal spirally threaded portion which threads onto the spirally coiled spring. Rotation of the bayonet cap relative to the spring causes the bayonet cap to thread itself along the spring and selectively move closer to, or further from, the hot junction tip portion. This adjustment makes it possible to vary the immersion depth of the thermocouple and also insures that the necessary spring force will be applied at any given immersion depth. Previous adjustable spring-loaded thermocouples of the type described have required both an elongated tubular sheath for supporting the bayonet cap, and a spiral spring surrounding the sheath for threading adjustment of the bayonet cap and application of the desired spring force. The need for assembling all of these individual components is very expensive and complicated. In every adjusted position of the bayonet cap, except the maximum immersion depth position, the rigid tubular sheath projects rearwardly from the bayonet cap. This rigid tubular sheath is easily damaged and may be bent when projecting rearwardly from the bayonet cap so that further adjustment would not be possible. Projection of the rigid tubular sheath rearwardly of the bayonet cap also makes it impossible to bend the thermocouple wires directly adjacent the rear of the bayonet cap as is sometimes desired when space is limited. Elimination of the tubular sheath could result in abrasion or other damage to the rather fragile thremocouple wires.

It would be desirable to have an adjustable spring-loaded thermocouple assembly which had a minimum number of parts and could be bent directly rearward of the bayonet cap while providing maximum protection to the thermocouple wires.

SUMMARY OF THE INVENTION

An adjustable spring-loaded temperature sensing device includes an elongated temperature sensing unit having a tip portion. A flexible armored cable having a continuous enclosed peripheral surface completely encloses at least a portion of the temperature sensing unit. Fastener means is attached to the cable for fastening the cable and the temperature sensing unit in operative position. The armored cable is attached to the temperature sensing unit on at least one side of the fastener means at a position spaced axially therefrom. The armored cable itself is resiliently deformable axially thereof to selective deformed positions for moving the tip portion of the temperature sensing unit toward the fastener means. In its deformed positions, the cable itself acts as a spring to resiliently urge the tip portion into operative position away from the fastener means.

In accordance with a preferred arrangement, the fastener means is adjustable along the length of the armored cable and has attachment means thereon for selectively attaching the fastener means to the cable at selective variable distances from the tip portion of the temperature sensing unit. In a preferred arrangement, the attachment means for attaching the fastener means to the cable comprises a thread formed on the fastener means which threadedly engages a spiral groove on the armored cable.

In accordance with one arrangement, the tip portion of the temperature sensing unit includes an elongated cylindrical portion having an outer diameter. The armored cable comprises a spirally coiled member forming a spiral coil, with each adjacent coil having edge portions overlapping one another. The spiral coil has an internal diameter in a relaxed condition thereof which is less than the outer diameter of the elongated cylindrical portion of the tip. The cable is resiliently compressible to move its adjacent coils closer together and increase its internal diameter. With the cable compressed and its adjacent coils positioned closer together, the internal diameter of an end portion of the cable is a sliding fit over the cylindrical portion of the tip. Relaxation of the compressive force on the cable allows adjacent coils to resiliently expand away from one another to decrease the internal diameter. The end portion of the cable then tightly girps the cylindrical portion of the tip, and adjacent coils on the end portion of the cable are positioned closer together than the other coils of the cable.

In accordance with another aspect of the invention, the tip portion of the temperature sensing unit includes a head portion, a cylindrical threaded portion and an unthreaded shank portion connecting the threaded portion to the head portion. The shank portion intersects the head portion at a shoulder. A flexible spirally coiled spring element has an end portion threaded onto the threaded portion of the tip. Adjacent coils on the end portion of the spring element are compressed together on the shank portion of the tip between the shoulder and the threaded portion to lock the spring onto the tip.

In accordance with another arrangement, a bayonet cap is rotatably attached to the end portion of a flexible armored cable. A temperature sensing unit includes a tip portion having a spirally coiled spring element attached thereto. The spring element is threaded into the bayonet cap so that relative rotation between the bayonet cap and the spring element will move the tip portion of the temperature sensing unit toward or away from the bayonet cap.

It is a principal object of the present invention to provide an improved adjustable thermocouple assembly which is more economical to manufacture than previous arrangements.

It is also an object of the present invention to provide an improved adjustable spring-loaded temperature sensing device which may be bent at an angle directly behind a bayonet cap in any adjusted position thereof.

It is a further object of the present invention to provide an improved connection between a tip portion of a temperature sensing unit and a spring element.

It is another object of the present invention to provide an improved thermocouple assembly which utilizes a protective flexible armored cable as a spring element.

BRIEF DESCRIPTION OF THE DRAWINGS

The invention may take physical form in certain parts and arrangements of parts, preferred embodiments of which will be described in detail in this specification and illustrated in the accompanying drawings which form a part hereof.

FIG. 7 is a side elevational view of another form of an adjustable spring-loaded temperature sensing device constructed in accordance with the present invention;

FIG. 8 is a cross-sectional elevational view showing an adapter and a body member to which the improved temperature sensing device of the present invention is attached;

FIG. 9 is a cross-sectional elevational view showing the improved temperature sensing device of the present invention installed on the adapter and body member of FIG. 8;

FIG. 10 is an exploded side elevational view of a temperature sensing unit;

FIG. 11 is a cross-sectional elevational view of a temperature sensing unit showing an improved arrangement for securing a spirally coiled spring element thereto;

FIG. 12 is an exploded cross-sectional elevational view of another form of adjustable spring-loaded temperature sensing device constructed in accordance with the present invention; and FIG. 13 is a side elevational view showing the elements of FIG. 12 in assembled condition.

DESCRIPTION OF THE PREFERRED EMBODIMENTS

Figure 1:
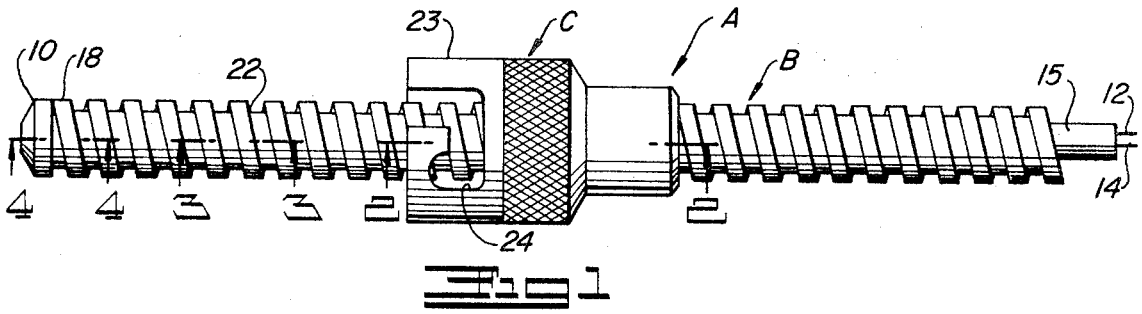
FIG. 1 is a side elevational view of an adjustable spring-loaded temperature sensing device constructed in accordance with the present invention.

Referring now to the drawings, wherein the showings are for purposes of illustrating preferred embodiments of the invention only and not for purposes of limiting same, FIG. 1 shows an adjustable spring-loaded temperature sensing device A. Temperature sensing device A has an elongated temperature sensing unit defined by the assembly of a tip portion 10, and a pair of wires 12 and 14 of a dissimilar metal. Wires 12 and 14 are insulated from one another and are connected together within tip portion 10 define a hot junction tip portion of a thermocouple. Wires 12 and 14 are connected to an indicating device in a known manner for indicating an electromotive force produced by varying temperatures sensed by tip portion 10. Wires 12 and 14 may be encased within a woven sheath 15 of glass or metal yarn for further protection. A flexible armored cable B surrounds at least a portion of wires 12 and 14, and has an end portion 18 connected with tip portion 10. A fastener means defined by bayonet cap C is attached to flexible cable B by a selective attachment means which enables positioning of fastener means C at selective variable distances from tip portion 10.

Figures 2, 3:
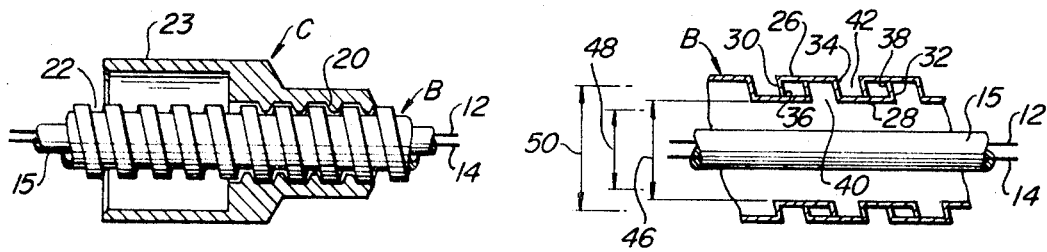
FIG. 2 is a cross-sectional elevational view looking in the direction of arrows 2—2 of FIG. 1.
FIG. 3 is a cross-sectional elevational view looking in the direction of arrows 3—3 of FIG. 1.

In accordance with one arrangement, as shown in FIG. 2, bayonet cap C has internal threads 20 formed therein defining an attachment means for selectively attaching bayonet cap C to cable B at variable distances from tip portion 10. Cable B has a spiral groove 22 therein for cooperation with threads 20 so that relative rotation between bayonet cap C and cable B will cause bayonet cap C to thread along cable B. Bayonet cap C includes an enlarged head portion 23 for positioning over an adapter in a known manner. A slot 24 in head portion 22 of bayonet cap C cooperates with a pin on an adapter for locking bayonet cap C in position.

In accordance with one arrangement, flexible armored cable B is formed from a spirally coiled strip of metal. The strip has a cross-sectional shape including an inverted substantially U-shaped portion 26 and an upright substantially U-shaped portion 28. Each U-shaped portion 26 and 28 includes a free outer leg 30 and 32, and a common central leg 34. Free leg portion 30 of inverted U-shaped portion 26 has a free end 36 facing downwardly, while free outer leg 32 of upright U-shaped portion 28 has a free end 38 facing upwardly. Free leg portion 30 and common leg 34 are spaced-apart axially of cable B to define an open pocket 40 which opens downwardly. Free leg 32 and common leg 34 are spaced-apart axially fo cable B to define an open pocket 42 which opens upwardly.

Free legs 30 and 32 have a predetermined thickness axially of cable B which is substantially less than the predetermined width of pockets 40 and 42 measured axially of cable B. Th strip is spirally coiled as shown in FIG. 3 with free leg 30 of inverted U-shaped portion 26 received in an adjacent pocket 42 of upright U-shaped portion 28, and free leg 32 of upright U-shaped portion 28 is received in pockets 40 of inverted U-shaped portion 26. Free leg 30 of inverted U-shaped portion 26 is positioned intermediate free leg 32 and common leg 34 of an adjacent coil, while free leg 32 is positioned intermediate free leg 30 and common leg 34 of adjacent coils.

With the arrangement described, it will be recognized that adjacent coils of cable B may be moved closer together or further away from one another by applying a compressive or pulling force to cable B. Application of such forces to cable B will cause free legs 30 and 32 to move toward or away from one another. Such forces also cause free legs 32 to move toward or away from common legs 34, and move free legs 30 toward or away from common legs 34.

It will be recognized that the strip from which cable B is formed may be spirally coiled so that free legs 30 and 32 are positioned directly adjacent one another so that cable B will only be axially compressible and will not elongate. It is also possible to spirally coil the strip from which cable B is formed in such a manner that free legs 30 and 32 are positioned directly adjacent common leg 34 so that cable B will only be axially elongatable and will not be compressible. With the arrangements shown and described, it will be recognized that cable B has a substantially continuous and unbroken outer periphery which completely surrounds and protects wires 12 and 14 regardless of whether cable B is in a relaxed condition, an extended condition or a compressed condition.

Each adjacent coil in cable B is formed by an inverted U-shaped portion 26 and an upright U-shaped portion 28 integral with one another. Each of these coils is movable toward and away from one another and the edge portions of the coils overlap edge portions of adjacent coils at all times. Cable B is resiliently compressible and extensible when adjacent coils are moved toward or away from one another. Release of the compressing or extending force causes cable B to act as a spring as the deforming force in adjacent coils is released so that adjacent coils will resiliently tend to move away or toward one another.

In its normal relaxed condition, as shown in FIG. 3, cable B has an internal diameter indicated by numeral 46 which is measured across the base portions of upright U-shaped portions 28. When cable B is stretched, the adjacent coils become smaller just as they do in an ordinary coiled spiral spring. In its stretched contions, the base portions of upright U-shaped portions move closer together across the diameter of cable B so that the internal diameter of cable B is reduced to that shown at 48. When cable B is compressed to move adjacent coils closer to one another, the coils increase in diameter and the base portions of upright U-shaped portions 28 move further apart as measured across the internal diameter of cable B so that the internal diameter increases to that shown at 50. Diameter 48 is less than relaxed diameter 46, while diameter 50 is greater than both diameters 46 and 48. Releasing the compressive or elongating force on cable B will return cable B to a condition in which the internal diameter is the same as that indicated at 46.

In accordance with one arrangement, hot junction tip portion 10 includes an elongated cylindrical portion 54 extending axially therefrom. Cylindrical portion 54 has an outer diameter which is greater than inner diameter 46 of cable B in its relaxed condition, and less than internal diameter 50 in a compressed condition of cable B. It is also possible to arrange the diameter of cylindrical portion 54 for an interference fit within diameter 50 of cable B. Therefore, compression of cable B to move adjacent coils closer together will cause the internal diameter of cable B to expand to diameter 50 so that end portion 18 of cable B can be received over cylindrical portion 54 of tip 10. Release of the compressive force on cable B will then allow the spring action in cable B to tend to move adjacent coils back to their relaxed condition shown in FIG. 3, so that the internal diameter of cable B will return to that shown at 46. This will cause the base portions of upright U-shaped portions 28 to tightly grip the outer peripheral surface of cylindrical portion 54 becuase the outer diameter of cylindrical portion 54 is greater than diameter 46. Adjacent coils at the end portion 18 of cable B cannot return to their normally spaced relationship in the relaxed condition of cable B and will be positioned closer together than the remainder of the coils in cable B beyond the cylindrical portion 54. Grabbing tip portion 10 and pulling on cable B will simply cause the adjacent coils in end portion 18 to more tightly grip cylindrical portions 54 becuase a pulling force on cable B reduces the diameter of each coil.

The strip from which cable B is formed is also spirally coiled in a clockwise direction when proceeding from right-to-left in FIG. 1. Therefore, holding tip 10 while twisting cable B in a counter-clockwise direction simply tends to tighten the coils together because the coils are being wound tighter, and adjacent coils over cylindrical portion 54 will simply grip even more securely. Winding cable B in a spiral direction when proceeding from right-to-left in FIG. 1 also has the bases of upright U-shaped portions 28 in the form of a right hand screw thread. Therefore, a clockwise rotation of cable B while holding tip 10 stationary tends to make end portion 18 screw more tightly on cylindrical portion 54.

This form of joint between cable B and tip portion 10 has been found to be extremely secure and difficult to separate. The joint resists all normal effort against separation and will not accidentally become broken. The joint can be released by once again compressing cable B and carefully holding adjacent coils of end portion 18 around cylindrical portion 54 in their maximum compressed condition while pulling on tip portion 10. It will be recognized that this readily releasable type of connection is very advantageous because failure of the thermocouple unit itself makes it possible to easily remove tip portion 10, and wires 12 and 14, from cable B, so that cable B can be readily connected with another temperature sensing unit. Previous arrangements using solder or swagged connections are much more difficult to disassemble.

In the arrangements shown and described, any adjusted position of bayonet cap C along cable B, to vary the distance between tip portion 10 and bayonet cap C, still makes it possible to bend armored cable B, along with wires 12 and 14, immediately rearwardly of bayonet cap C. This is particularly advantageous where space is very crowded and the indicating instrument is located laterally of bayonet cap C. Armored cable B offers complete protection to the temperature sensing assembly rearwardly of bayonet cap C so there are no exposed parts which might become permanently bent or otherwise damaged.

Figure 4:
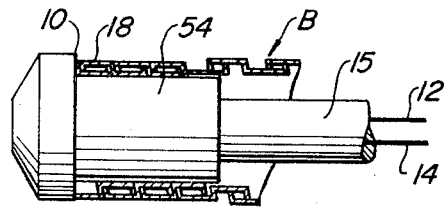
FIG. 4 is a cross sectional elevational view looking in the direction of arrows 4—4 of FIG. 1.
Figure 5:
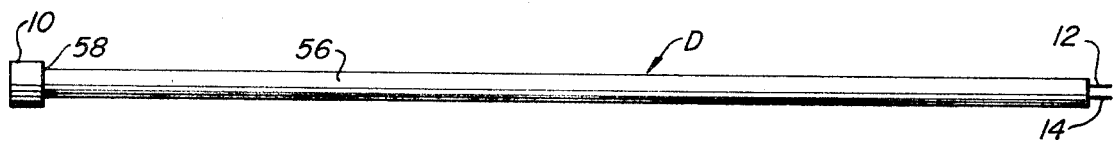
FIG. 5 is a side elevational view of a temperature sensing unit forming a component of a temperature sensing device constructed in accordance with the present invention.
Figure 6:
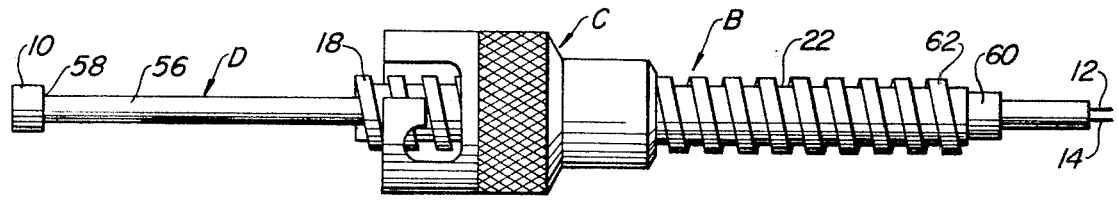
FIG. 6 is a side elevational view of another form of an adjustable spring-loaded temperature sensing device constructed in accordance with the present invention.

In accordance with another arrangement, a temperature sensing unit D in FIG. 5 may have a rigid tubular metal sheath 56 received over wires 12 and 14, and soldered or welded to tip 10 as at 58. Temperature sensing unit D is receivable through flexible armored cable B as shown in FIG. 6. In one arrangement, a substantial portion of sheath 56 may extend outwardly from end portion 18 of cable B so that tip portion 10 is axially spaced a substantial distance from end portion 18 of cable B. Bayonet cap C is threaded onto cable B in the same manner as described with reference to FIG. 2. A metal cylindrical plug member 60 is received over tubular sheath 56 and soldered or otherwise fixedly secured thereto against axial movement. An opposite end portion 62 of cable B may then be attached to cylindrical plug member 60 in the same manner as described with reference to FIG. 4. It will be recognized that it is also possible to secure end portion 62 of cable B to sheath 56 by soldering or in any other suitable manner. In this embodiment, bayonet cap C is movable toward tip portion 10 by axially extending cable B. Once bayonet cap C is securely locked onto an adapter, the spring force tending to return cable B to its relaxed condition will pull sleeve member 60 toward bayonet cap C and also tend to move sheath 56 axially for biasing tip portion 10 away from bayonet cap C into operative position.

In accordance with the arrangement shown in FIG. 7, elongated sheath 56 of temperature sensing unit D extends through flexible cable B. End portion 18 of cable B is secured to tip 10 in the same manner as described with respect to FIG. 4. Other end portion 62 of cable B is secured to cylindrical plug 60 in the same manner as described with respect to FIG. 6. End portion 62 of cable B, or even an intermediate portion of cable B, may be secured to sheath 56 by soldering or deformation. Bayonet cap C is threaded onto cable B and moves therealong to adjusted positions spaced closer or further from tip 10. An axial force applied to bayonet cap C to move it toward tip 10 will compress adjacent coils of cable B between tip 10 and bayonet cap C, while spacing adjacent coils further apart between bayonet cap C and cylindrical plug 60. When bayonet cap C is thus applied to an adapter, the spring force in cable B between tip 10 and bayonet cap C will tend to force tip 10 away from bayonet cap C, while the spring force in that portion of cable B between bayonet cap C and cylindrical plug 60 will tend to move plug 60 toward bayonet cap C and act through sheath 56 to also tend to move tip 10 away from bayonet cap C. Cable B thus acts between bayonet cap C and tip 10 as a compression spring tending to force tip 10 away from bayonet cap C, while acting as a tension spring between bayonet cap C and cylindrical plug 60 tending to pull plug 60 toward bayonet cap C.

The adjustable spring-loaded temperature sensing device of the present application is adapted to measure the temperature of a body E which is shown in FIG. 8. Body member E may either be a mounting member for securement to a portion of a machine or the like, or may itself define a part of the machine. For example, body member E may define the wall of a tube through which melted plastic flows in an injection molding machine. It will be recognized that the improved temperature sensing device of the present invention may be utilized for measuring temperatures of various devices and may be located in various positions. Member E has an enlarged threaded bore 66 form therein, and a concentric smaller diameter bore 68. An adapter F has a threaded end portion 70 threaded into threaded bore 66. Adapter F has a central bore 72 of substantially the same diameter as bore 68 in body member E, and is axially aligned therewith when adapter F is threaded into threaded bore 66. Adapter F includes a head portion 74 having a radially extending pin 76 thereon.

Insertion of temperature sensing device A into operative position is shown in FIG. 9. Bores 68 and 72 have a larger diameter than tip portion 10 and cable B. Tip portion 10 and a length of cable B are extended through bores 68 and 72 to the position shown in FIG. 9. Tip portion 10 is in firm engagement with the bottom of bore 68. Bayonet cap C is threaded rearwardly along cable B until it is still spaced from head portion 74 of adapter F when tip portion 10 strikes the bottom of bore 68. An axial force is then applied to bayonet cap C to move bayonet cap C over head portion 74 of adapter F. This compresses that portion of cable B extending between adapter C and tip portion 10. Radially extending pin 76 is then positioned in slot 24 and bayonet cap C is rotated to lock bayonet cap C onto head portion 74 of adapter F by means of slot 24 and pin 76 in a known manner. The resiliency of adjacent coils in cable B constantly biases tip portion 10 away from bayonet cap C so that tip portion 10 is in firm engagement with the bottom of bore 68. For varying depths of bore 68, it will now be recognized that it is simply necessary to rotate bayonet cap C relative to cable B to position bayonet cap C at any desirable adjusted position from tip portion 10 so that tip portion 10 will be resiliently biased into engagement with the bottom of the bore regardless of its depth. In addition, it will be recognized that the arrangement shown and described makes it possible to flex cable B, along with wires 12 and 14, immediately rearward of bayonet cap C in any adjusted position of bayonet cap C. Bending of flexible cable B occurs in a conventional manner. With reference to FIG. 3, a bending force applied to cable B, as by grabbing the right hand end in FIG. 3 and pulling downwardly, will cause free leg portions 30 and 32 to move toward one another for elongating the top portion of cable B. At the same time, such a bending force will cause the lower opposite portion of cable B to compress because free leg portions 30 and 32 will move away from one another. This makes it possible to bend cable B immediately adjacent the rear end of bayonet cap C for connecting wires 12 and 14 to an appropriately located indicating device. The flexibility of cable B immediately rearwardly of bayonet cap C also prevents damage to the temperature sensing unit. A solid object striking cable B will simply cause cable B to bend without any damage to the cable itself or the temperature sensing unit. The armored cable extending between bayonet cap C and tip 10 also protects the temperature sensing unit from damage when temperature sensing device A is removed from its mounted position.

Another arrangement in accordance with the present invention is shown with regard to FIGS. 10 and 11. In the arrangement shown, a tip portion H of a thermocouple member having a pair of wires 82 and 84 of dissimilar material, insulated from one another and connected to one another within tip H, defines a temperature sensing unit. Wires 82 and 84 may be encased within a braided sheath 86 of metal or glass yarns. Tip H includes a head portion 88 having a head diameter and a cylindrical threaded portion 90. Threaded portion 90 has a spiral thread 92 formed thereon. Head portion 88 and threaded portion 90 are separated by a cylindrical shank portion 94 which intersects head portion 88 at a shoulder 96. Shank portion 94 may be of substantially the same diameter as the internal diameter of spring element J in its relaxed condition, or may be slightly larger. A conventional spirally coiled spring element J is receivable over wires 82 and 84, and covering 86. The external diameter of threaded portion 90 is slightly greater than the internal diameter of spring element J, while threads 92 correspond in spacing and root diameter with the spacing of adjacent coils in spring element J, and with the internal diameter thereof. Spring element J may be rotated in a clockwise direction relative to tip H for threading an end portion of spring element J onto threaded portion 90. The length of shank portion 94 between head 88 and threaded portion 90 is at least as great as the thickness of two adjacent coils of spring element J when two such adjacent coils are pressed into contact with one another. Spring element J is rotated until terminal end coil 102 thereof strikes against shoulder 96. Continued rotation of spring element J will then cause additional coils to move off from threaded portion 90 onto shank 94. Continued rotation will tightly compress a plurality of terminal coils between shoulder 96 and threaded portion 90 on shank 94. These adjacent coils will be tightly compressed together and will be biasing against both shoulder portion 96 and threaded portion 90 to provide a considerable normal frictional force retarding movement thereof in a reverse direction. Therefore, for a spring element which is spirally coiled in a clockwise direction from right-to-left in FIG. 11, to form a right hand thread, a counter-clockwise twist on spring element J in an attempt to unthread the end portion thereof from head H will be resisted by the previously described frictional force due to the tightly compressed coils on shank portion 94. This resistance against rotation will cause adjacent coils of spring element J to become more tightly coiled so that their internal diameter will be reduced and those coils threaded onto threaded portion 90 will tightly grip threaded portion 90 with an additional frictional force which resists rotation of the end portion of spring element J in an unscrewing direction from tip H. A bayonet cap similar to that shown at C with respect to the other embodiments may be threaded onto spring element J so that the temperature sensing unit may be placed in operative position in the same manner as described with reference to FIG. 9. The end portion of spring element J resists all normal efforts to remove spring element J from tip H. However, spring element J may be rather easily removed from tip H by utilizing a pointed instrument to contact the very end of last coil 102 and push against that end in an unscrewing direction of spring element J while holding tip H against rotation. This prevents the previously described tightening of the coils onto threaded portion 90 so it is possible to overcome the frictional force holding the compressed coils between shoulder 96 and threaded portion 90 on shank 94 to move the end portion of the coils slightly in an unscrewing direction. Once the frictional resistance of tightly compressed coils on shank portion 94 has been overcome in this manner, it is possible to hold tip H against rotation while grabbing spring element J to rotate it in an unscrewing direction for removal from tip H. It will be recognized that the same type of joint may be utilized with respect to the armored cable described with reference to FIGS. 1-4. In such an arrangement, the threads on threaded portion 90 would be formed to correspond with the base portions of upright U-shaped portions 28. In other respects, the locking action would be the same.

FIGS. 12 and 13 show another arrangement constructed in accordance with the present invention for providing an adjustable spring-loaded temperature sensing device which is easily bendable rearwardly of the connection to an adapter without exposing any easily damaged rigid tubular sheath. In this arrangement, the same temperature sensing unit described with respect to FIGS. 10 and 11 may be utilized. A flexible cable K of identical construction with previously described cable B, but of larger diameter, may also be utilized. A fastener means defined by bayonet cap L has internal screw threads 112 formed therein for threading onto spring element J. Bayonet cap L has a circumferential groove 114 for receiving a resilient C-ring M which is split as at 116. Resilient ring M has a plurality of outwardly extending resilient fingers 118 thereon. A connector member N has a bore 120 sized to receive rear end portion 122 of bayonet cap L. A circumferential groove 124 is also formed in connector N. Once resilient ring M is positioned in groove 114, rear end 122 of bayonet cap L may be shoved through bore 120. Resilient arms 118 will deform inwardly when passing through bore 120 and will spring out when groove 124 is reached to rotatably lock bayonet cap L onto connector N.

Connector N also has a bore 128 dimensioned to receive an end portion of flexible armored cable K. Once the end portion of cable K is received in bore 128, connector N may be deformed radially inward as shown at 130 in FIG. 13 to tightly grip the end portion of cable K and lock connector N thereto. It will be recognized that other arrangements, such as soldering or the like, may be utilized for securely locking connector N onto the end portion of cable K. Once the parts are assembled, they are arranged as shown in FIG. 13. Relative rotation between spring element J and bayonet cap L will selectively move tip H either toward or away from bayonet cap L. The distance which tip H projects from bayonet cap L is variable in order to vary the depth of bores in which the temperature sensing unit is positioned and to vary the spring force with which tip H is biased into engagement with the bottom of a bore. Spring J extends completely through bayonet cap L, connector N and upwardly into cable K. Wires 82 and 84, along with sheath 86, are very flexible and will simply bunch or coil up within armored cable K during adjustment of the projecting length for tip H. When this temperature sensing device is installed as described with respect to FIG. 9, the projecting portion of the temperature sensing device is completely protected and there are no fragile tubular sheaths or wires which will become easily damaged. In addition, cable K may be bent to any desired position immediately rearward of connector N. In previous arangements of this type, bayonet cap L has been threadable along spring J away from connector N or an end portion of cable K which would either expose an easily damaged tubular sheath, or the wires of the temperature sensing unit itself. In such a previous arrangement, installation of the temperature sensing device as described with respect to FIG. 9 would leave an easily bent tubular sheath exposed between bayonet cap L and the end portion of cable K.

While the invention has been described with reference to certain preferred embodiments, it is obvious that alterations and modifications will occur to others skilled in the art upon reading and understanding this specification. The present application includes all such equivalent alterations and modifications, and is limited only by the scope of the claims.

I claim:

1. A temperature sensing device comprising; an elongated temperature sensing unit including a tip portion, said tip portion including a head portion having a head diameter and a cylindrical portion having a diameter less than said head diameter, said cylindrical portion intersecting said head portion at an outwardly extending shoulder, an elongated flexible longitudinally resilient hollow element surrounding at least a portion of said temperature sensing unit, said resilient hollow element having an end portion received over said cylindrical portion, said end portion being longitudinally compressed and in resilient gripping engagement with said cylindrical portion to hold said tip portion on said end portion of said resilient hollow element.

2. The device of claim 1 wherein said resilient hollow element comprises a spirally coiled spring element having a plurality of adjacent coils, said spring element having a first internal diameter in a relaxed condition thereof, said spring element being longitudinally compressible to a compressed condition by moving said adjacent coils toward one another and having a second internal diameter in said compressed condition thereof which is greater than said first internal diameter, said cylindrical portion having a diameter greater than said first internal diameter, said end portion of said spring element having adjacent coils thereof positioned closer together than the other adjacent coils in said spring element when said cylindrical portion is received in said end portion.

3. The device of claim 2 wherein said spring element comprises a flexible armored cable having a continuous closed outer periphery formed by a spirally coiled strip defining a plurality of adjacent coils having overlapping edges.

4. The device of claim 1 wherein said cylindrical portion includes a threaded portion having a spiral thread formed therein and an unthreaded shank portion between said shoulder and said threaded portion, said resilient hollow element comprising a spirally coiled spring element having longitudinally-spaced adjacent coils, said end portion of said spring element having coils thereof threaded onto said threaded portion, and said end portion including coils compressed together on said shank portion between said shoulder and said threaded portion for locking said spring element onto said tip portion.

5. An adjustable spring-loaded temperature sensing device comprising; an elongated flexible closed conduit having an end portion, an elongated temperature sensing unit extending through said conduit and having a tip portion extending axially beyond said end portion of said conduit, fastener means attached to said end portion of said conduit in a fixed axial position against axial movement relative to said conduit for fastening said end portion of said conduit to another member, said fastener means having an internal spiral thread, a spirally coiled longitudinally resilient spring element having a plurality of adjacent coils, said spring element having a spring element end portion attached to said tip portion and an opposite portion threaded into said spiral thread on said fastener means, said fastener means and said spring element being rotatable relative to one another for selectively threading said spring element into and out of said fastener means for locating said tip portion at selectively variable axially-spaced positions from said fastener means.

6. The device of claim 5 wherein said fastener means is rotatable in a fixed axial position relative to said conduit.

* * * * *